United States Patent
Fruge

[19]

[11] Patent Number: 5,954,512
[45] Date of Patent: Sep. 21, 1999

[54] BEHAVIOR TRACKING BOARD

[76] Inventor: David M. Fruge, 8037 Vincent Rd. #21, Denham Springs, La. 70726

[21] Appl. No.: 09/061,258

[22] Filed: Apr. 17, 1998

Related U.S. Application Data

[60] Provisional application No. 60/048,528, Jun. 3, 1997.

[51] Int. Cl.$^6$ .................................................. G09B 19/00
[52] U.S. Cl. ......................... 434/238; 434/236; 434/365
[58] Field of Search .................................. 434/236, 237, 434/238, 365, 420; 273/236, 281

[56] References Cited

U.S. PATENT DOCUMENTS

| | | |
|---|---|---|
| 2,414,614 | 1/1947 | Shurick . |
| 2,883,765 | 4/1959 | Blaine . |
| 2,918,730 | 12/1959 | Schrade . |
| 2,965,978 | 12/1960 | Olson . |
| 3,035,355 | 5/1962 | Holmes . |
| 3,782,009 | 1/1974 | Darnell . |
| 4,776,799 | 10/1988 | Walsh . |
| 5,372,509 | 12/1994 | Brocato et al. . |

*Primary Examiner*—Paul J. Hirsch
*Assistant Examiner*—Michael B. Priddy
*Attorney, Agent, or Firm*—Richard C. Litman

[57] ABSTRACT

A behavior tracking board provides for the recording and monitoring of the general behavior of individuals. The board is particularly well suited for use in families having one or more small children, where it may be used to monitor their behavior over a predetermined period of time (e.g., one week) for the determination of rewards or punishment based upon the behavior for that period. The present tracking board is also adaptable to school and day care environments, and is capable of providing separate behavior monitoring tracks for a large group of children or individuals. Another embodiment is directed to the monitoring of allowance and monetary reward, and is particularly suited for tracking the behavior of teens. The board basically comprises one or more horizontal rows, with each row corresponding to a single individual or child. Each of the rows includes a movable marker captured in a track therealong, with the markers initially each being placed to the extreme right end of their respective tracks. As the time period progresses, the markers are moved leftward along the track when less than desirable behavior by the person being monitored, occurs. Alternatively, markers could initially be centrally positioned, and moved to the right for exemplary behavior and to the left for less than desirable behavior. Various means of hanging or supporting the board are also disclosed, as well as a method of monitoring behavior using the present board.

15 Claims, 4 Drawing Sheets

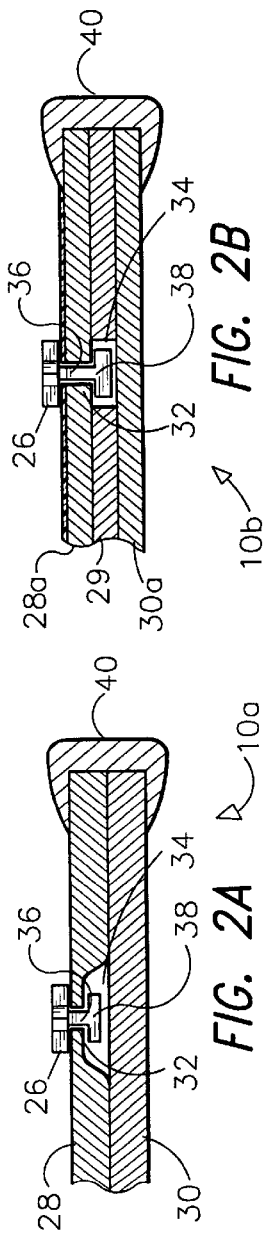
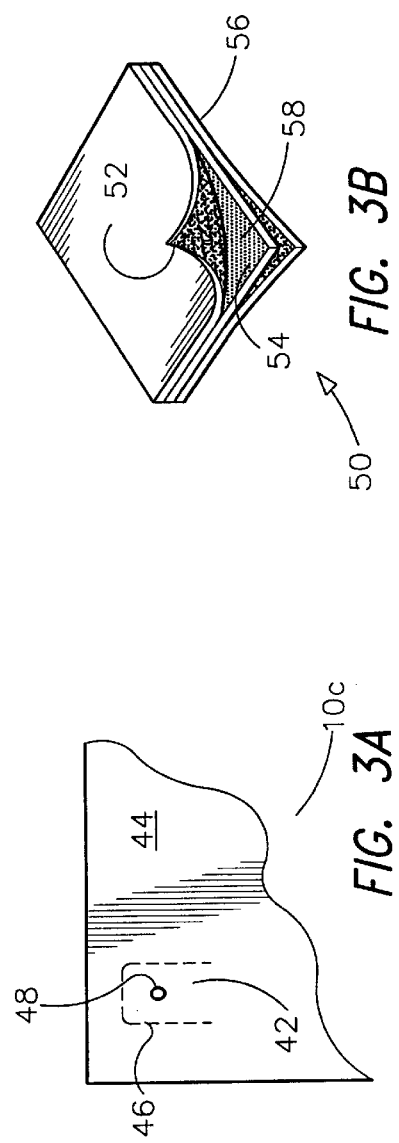
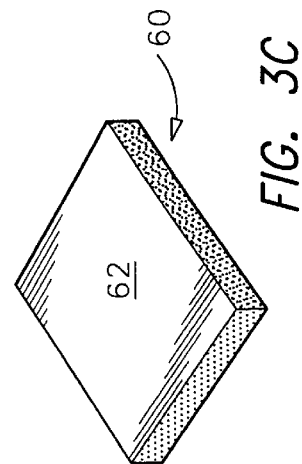

BEHAVIOR TRACKING BOARD

REFERENCE TO RELATED PATENT APPLICATION

This application claims the benefit of U.S. patent application Ser. No. 60/048,528, filed on Jun. 3, 1997.

BACKGROUND OF THE INVENTION

1. Field of the Invention

The present invention relates generally to event recording means, and more particularly to a tracking or tally board for recording behavioral attributes of one or more persons in a group over a period of time, e.g., a child in a household over a period of one week. The board is preferably visible to the person whose behavior is being monitored, and serves as a reminder of some reward for good behavior on the part of the person, or withholding of such reward and/or possible punishment for poor behavior.

2. Description of the Related Art

Every parent and teacher knows the difficulty in raising children to behave properly. It seems that the instilling of proper behavioral habits in children has become increasingly difficult, due to negative role models provided by movies, television, and peers. Another factor which influences this trend is that parents have increasing demands upon their time, and teachers are required to spend ever increasing amounts of time on various subjects, to the extent that oftentimes poor behavior goes unpunished. Children are capable of learning quite quickly, and may learn under such conditions that such poor behavior is acceptable, or at least that it will likely go unpunished.

Accordingly, many experts in the field have written innumerable magazine articles on the subject of child behavior, and methods of developing proper behavior in children. Indeed, it seems that this subject is a common one for television talk shows and other venues where the subject comes up from time to time. The patent field also includes various devices which are intended to encourage good behavior, or discourage bad behavior, in children, as will be described further below. While many written and spoken words have been put forth on the subject, it nevertheless seems that little practical work has been accomplished toward this most desirable goal of developing good behavioral habits in children. Yet, such good behavior is critical, as adults tend to carry over the same personality and character traits which they developed as children.

The present invention responds to this need with a behavior tracking board which may be used by parents for children in the family, or in a slightly modified form by teachers who are responsible for a group of children. The present board provides a relatively objective means of keeping track of the behavior of one or more children over a predetermined period of time (e.g., one week), and also maintains the awareness of the child or children as to their status relative to reward or punishment according to the board. A discussion of the related art of which the present inventor is aware, and its differences and distinctions from the present invention, is provided immediately below.

U.S. Pat. No. 2,414,614 issued on Jan. 21, 1947 to Edward P. Shurick, Sr., titled "Children's Behavior Indicator," comprises a board having a plurality of horizontal channels formed therein. Each of the channels contains a slide which may be advanced along the corresponding channel during the course of a week, according to the behavior of the child corresponding to the particular slide. A coin or the like is deposited at the end of each slide, to drop from the board when the slide reaches the far end of its travel and pushes the coin from the board. Shurick, Sr. provides no additional reward for exceptional behavior or for additional behavioral performance, as is provided by the present behavioral tracking board. Moreover, the Shurick, Sr. board has no provision for indicating any punishment for bad behavior, which punishment indication means is provided by the present board. Movement of the indicators of the present board is not based upon any particular time period (e.g., per day, as with Shurick, Sr.), but instead is based upon behavior, with the indicators being moved according to the children's behavior at any given point. The present board assumes good behavior, with no indicator movement being required should such good behavior prove to be the case for the period in question.

U.S. Pat. No. 2,883,765 issued on Apr. 28, 1959 to Alfred C. Blaine, titled "Child's Chores Recorder For Producing Incentive," comprises a vertically oriented board having a series of tags hanging thereon for daily chores, and a second series of tags representing bonuses and fines. A cylinder for holding coins is installed along the right hand edge of the device. Coins are given to the child at the end of each day, depending upon the chores completed and/or any fines for non-accomplishment of the chores. The child is expected to place at least some of his or her accrued coins into the coin holding cylinder, to encourage saving. The Blaine device does not provide for any behavior control per se, but rather only rewards or withholds reward from the child, depending upon the chores accomplished by the child. A child may be otherwise unruly or rude, but Blaine would still reward the child so long as the required chores were done. Moreover, Blaine fails to provide any form of punishment for such negative behavior, or even for failing to perform certain chores, other than withholding payment from the child.

U.S. Pat. No. 2,918,730 issued on Dec. 29, 1959 to Theodore G. Schrade, titled "Child's Behavior Recording And Incentive Device," comprises a baseball stadium layout. The child is rated from zero score to four points on each day of the week, and the score is recorded in an appropriate area of the board. Certificates are awarded to the child at the end of each period, e.g., one week, for a predetermined minimum score for the period. The Schrade board provides for only one child at a time, and thus would require as many boards as there were children in a given group. This would obviously be excessively cumbersome in the classroom. Moreover, Schrade makes no provision for punishment, other than merely withholding reward from a child whose performance is less than satisfactory for the period.

U.S. Pat. No. 2,965,798 issued on Dec. 27, 1960 to Harriette M. Olson, titled "Job Performance Board," comprises a plurality of vertical columns each associated with a particular day of the week, and a plurality of horizontal rows each associated with a particular task. Persons using the board are listed in a separate area at the top of the board. Tags associated with some reward for accomplishing the task, are assigned to each person listed on the board. As each person accomplishes some task listed along the leftmost vertical column, a tag is placed over that particular chore and date where the row and column intersect. Olson requires that the tags be coded in some way (colors, etc.) in order to determine which person accomplished which chore on which date. The present board does not show individual specific chores or tasks, but rather generally rewards good behavior (or punishes bad behavior), with each child having a separate row on the board.

U.S. Pat. No. 3,035,355 issued on May 22, 1962 to Royal W. Holmes, titled "Incentive Device," includes a plurality of columns into which coins may be placed. One column is provided for each day of the week, and stop means are provided at several points along each column. Chores are listed to one side, which correspond to the stop means. When the uppermost chore is completed, the stop means is removed, allowing the coin to fall to the next position. The Holmes device has several drawbacks, in that a separate board is required for each child being monitored. No provision is made for general behavior, or for the punishment of bad behavior, but only for the rigid completion of a set number of chores.

U.S. Pat. No. 3,782,009 issued on Jan. 1, 1974 to Eula K. Darnell, titled "Behavior Modification Point Board," comprises a board having a plurality of row and column slots therein. A leftmost column provides for the names of a plurality of students, while an upper row provides a list of desirable traits, habits, tasks to be completed, etc. A marker is placed within the corresponding slot whenever a student completes one of the upper row items satisfactorily. The markers are later exchanged for a reward of some sort. No time period is specified with the Darnell board, as only two variables can be provided for (in this case, the names of the students and the tasks). No additional rewards are provided for exceptional behavior, nor is any punishment provided for poor behavior, as provided by the present board.

U.S. Pat. No. 4,776,799 issued on Oct. 11, 1988 to Susan M. Walsh, titled "Portable, Self-Contained, Educational-Organizational System And Method Employing Such System," comprises a foldable panel having a list of jobs or chores for each of several persons, and a series of beads strung upon a lateral string for each person. As each chore is completed, the appropriate bead is moved from a "Do" position to a "Done" position. Parents, teachers, or supervisors provide some indication of award on a card when all chores for a given period are complete. When the card is filled, the award is provided to the child or student. As with other devices discussed above, Walsh fails to provide for any form of punishment in the event of non-completion of any of the chores or other undesirable behavior.

Finally, U.S. Pat. No. 5,372,509 issued on Dec. 13, 1994 to Sally K. Brocato et al., titled "Healthy Choices Play And Reward Kit," comprises a doll with a series of removably applicable messages. A child is to place the appropriate message for the day of the week on a hat worn by the doll, and then place appropriate messages relating to proper behavior, on various points of the doll body. The activity is repeated daily. Brocato et al. do riot provide any rewards to a child for exercising such good behavior, nor do they provide any punishment for a child who fails to exercise good behavior according to their kit. A separate doll is required for each individual, rather than using a single article (e.g., the present behavior tracking board) to accommodate several individuals.

None of the above inventions and patents, either singly or in combination, is seen to describe the instant invention as claimed.

SUMMARY OF THE INVENTION

The present invention comprises a behavior tracking board for maintaining a record of the behavior of one or more children or individuals over a period of time. The board includes a column for the placement of one or more names therein, and an upper row which notes generally the reward or punishment to be attained in accordance with the individual's behavior over the designated period of time. The upper row extends from right to left, with rewards decreasing and/or punishment increasing to the left.

Each of the horizontal rows includes means for the containment and lateral movement of a behavioral indicator therein, such as a horizontal slot with a marker (star, etc.) extending therefrom. Individuals are initially assumed to be on their best behavior, and all markers are moved to the extreme right side of the board at the beginning of the time period. As the period progresses, and some less than satisfactory behavior occurs from individuals listed on the left side of the board, the markers of those individuals are moved from the right side of the board toward the left side, in increments according to the judgment of the person responsible for the individuals. (Alternatively, markers could be placed centrally along the slots, with exemplary behavior resulting in movement of the marker to the right, and less than satisfactory behavior causing the marker to be moved to the left.) If an individual maintains a perfect record for the time period in question, a bonus may be awarded. These bonuses may be accumulated for additional reward(s). Special awards may also be provided for exemplary behavior. The specific behavior expected, and the rewards or punishment to be administered, are left to the discretion of the person responsible for monitoring the individuals in question. The present invention may also include a method of monitoring and tracking the behavior of an individual.

Accordingly, it is a principal object of the invention to provide an improved behavior tracking board for tracking and monitoring the behavior of one or more individuals over a predetermined period of time.

It is another object of the invention to provide an improved behavior tracking board which is particularly suitable for monitoring the behavior of children, and which may accommodate an entire school classroom of children, if desired.

It is a further object of the invention to provide an improved behavior tracking board which includes selectively movable markers secured to the board, for moving to a desired point on the board to indicate whether behavioral standards have been met to that time.

An additional object of the invention is to provide an improved behavior tracking board which includes provision for bonus awards for exemplary behavior.

Still another object of the invention is to provide an improved method of tracking and monitoring the behavior of one or more individuals over a predetermined period of time, using a behavior tracking board.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2A is a broken away elevation view in section of the board of FIG. 1, showing the means used for securing the movable markers thereto.

FIG. 2B is a broken away elevation view in section of an alternative embodiment of the board of FIG. 1, showing alternative means used for securing the movable markers thereto.

FIG. 3A is a broken away rear elevation view of a corner of the board of FIG. 1, showing the support means for the board.

FIG. 3B is a broken away rear elevation view of a corner of an alternative board of FIG. 1, showing alternative support means for the board.

FIG. 3C is a broken away rear elevation view of a corner of another alternative board, showing further alternative support means for the board.

Similar reference characters denote corresponding features consistently throughout the attached drawings.

DETAILED DESCRIPTION OF THE PREFERRED EMBODIMENTS

The present invention is a behavior tracking board for tracking and monitoring the behavior of one or more individuals over a predetermined period of time. While the present board is adaptable to virtually any individual or group of individuals, it is particularly well adapted for use by parents to encourage proper behavior by their children, and for use by teachers or caretakers of small children in day nursery and school classroom environments. It should be noted that continuous and consistent use of the present behavioral tracking invention is therapeutic and comprises a form of behavioral therapy for participants in a program using the present invention.

Figure 1:
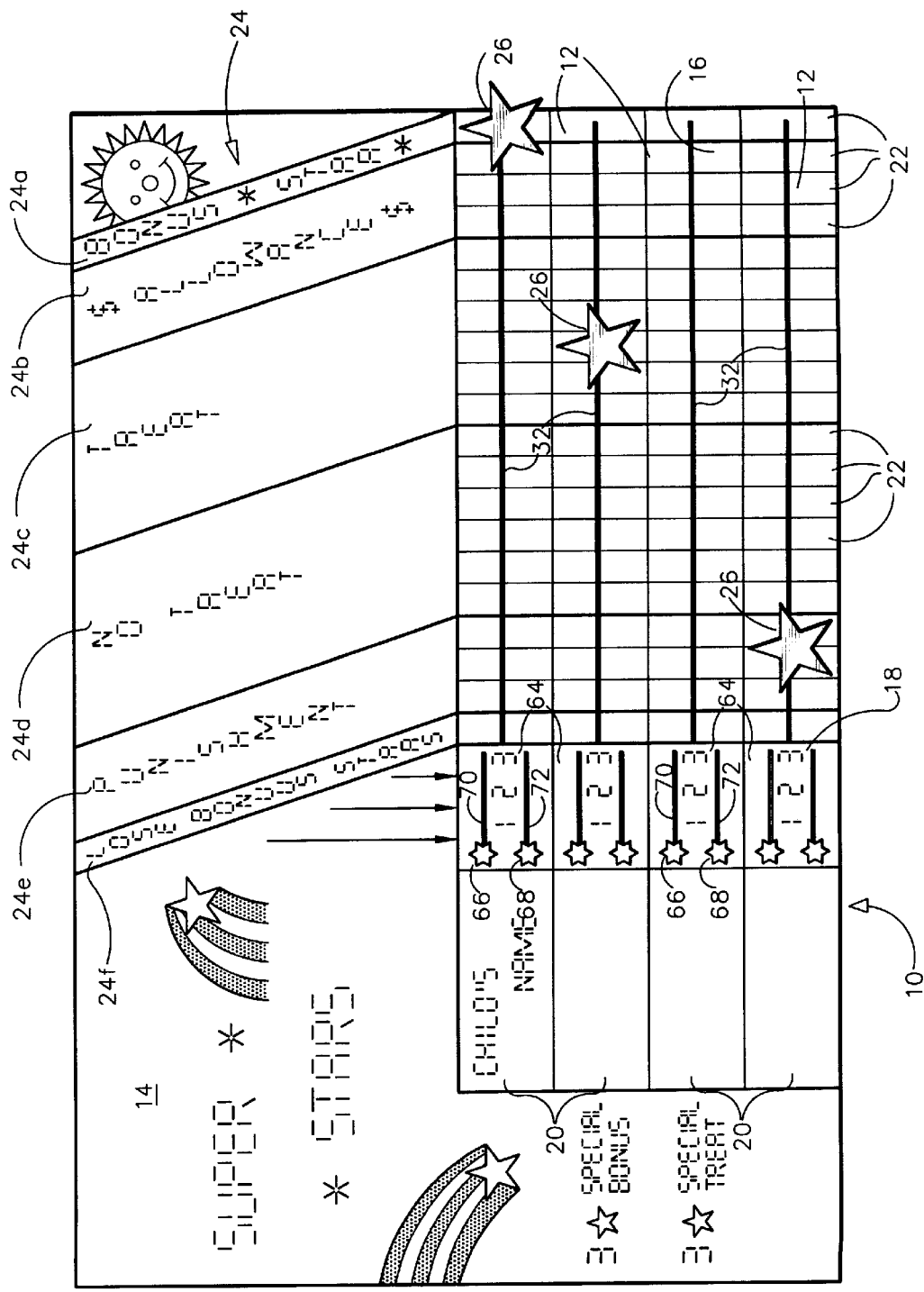
FIG. 1 is a plan view of the present behavior tracking board, showing its general features.

A first embodiment of the present tracking board is shown in FIG. 1, and is designated by the reference numeral 10. The board 10 is preferably of a flat, planar configuration, and includes at least one behavior status row 12 extending generally horizontally from left to right across the surface 14 of the board 10. (The number of rows 12 may be adjusted, depending upon the number of children or other individuals whose behavior is to be tracked and monitored using the present board 10. While four rows 12 are shown in FIG. 1, any practicable number of rows 12, from one to a sufficient number to monitor a classroom of children, may be provided.)

Each of the rows 12 has a right end 16 and an opposite leftmost end 18. An identification area 20 is positioned to the left of each of the leftmost ends 18 of each of the rows 12. These identification areas provide for the entry of the names of the individuals or children whose behavior is to be tracked using the present board 10, with one individual (and his/her identification area 20) being assigned to each row 12.

Each row 12 is divided into a plurality of behavior status positions 22 disposed therealong. A marker, described further below, is selectively placed at one of the behavior status positions 22 in each row 12 corresponding to a child or individual whose behavior is being tracked or monitored. The behavior status positions 22 represent generally good behavior toward the right end 16 of each row 12, with the represented behavior generally decreasing in quality toward the leftmost end 18 of each row 12.

A plurality of reward and punishment categories, generally designated by the reference numeral 24, extends generally upwardly above the rows 12. Each of the categories 24 is aligned above at least one of the behavior status positions 22 of the behavior status rows 12. These categories 24 define generally the reward or punishment which will be provided to the child or individual corresponding to each of the rows 12, depending upon the behavior of the child or individual for the predetermined period of time. The categories may provide for a bonus, as in the rightmost category 24a, allowance as in category 24b, a treat for good behavior as in category 24c. More negative behavioral reinforcement is provided in other categories, as in the withholding of a treat shown in category 24d, punishment as in category 24e, or the loss of bonus, as indicated in category 24f of the reward and punishment categories 24.

Each of the behavior status rows 12 includes a behavior status marker 26 which is selectively movable along the row 12 to indicate the behavioral status of the individual assigned that row 12, at any given point along the predetermined time period of behavior tracking. The markers 26 may comprise stars, as shown, or any other shape or configuration as desired.

These status markers 26 may be movably secured to the board 10 using any one of a number of means (electrostatic attraction, magnetism, mating hook and loop fastening material, etc.), as desired. However, in order to preclude loss of the markers 26, and the potential hazard should a toddler or infant attempt to eat one of the loose markers, the markers 26 are preferably positively captured on the board 10.

FIGS. 2A and 2B provide two alternate embodiments for movably capturing marker 26 on board 10. In FIG. 2a, the board 10a is formed of an upper layer 28 and a lower layer 30 of material, with the upper layer 28 having a slot 32 formed therethrough and lying along the centerline of each of the rows 12. The upper layer 28 has a relatively wide undercut portion 34 formed beneath the slot 32. (It will be seen that the wide channel 34 may be formed in the inner surface of the second layer 30, if desired.) The behavioral status marker 26 includes a shank 36 depending therefrom, to guide he marker 26 along the slot 32 of the row 12. A retainer 38 extends across the distal end of the shank 36, with the retainer 38 being captured within the undercut portion 34 of the slot 32 to capture the marker 26 slidably along the slot 32.

FIG. 2B discloses a variation on the above described means of positively capturing a marker 26 on the board. In FIG. 2B, a board 10b has a first or upper layer 28a, an opposite second or lower layer 30a, and an intermediate layer 29 sandwiched therebetween. The upper layer 28a includes a slot 32 therethrough for the shank 36 of the marker 26, with the intermediate layer 29 having a relatively wide undercut 34 formed therein to provide clearance for the retainer 38 of the marker 26. Other variations on the above marker capturing means are possible, such as having the marker shank pass completely through the board with a retainer securing the marker from the back side of the board. A sufficiently deep peripheral frame 40 would provide sufficient clearance between the retainer and any underlying surface to which the board was secured.

The above described board embodiments are preferably accessible to a parent, supervisor, or caretaker of the individuals named on the board, but the board is preferably removably secured to some object at a height and location which cannot be physically reached by the individuals named on the board, yet which is easily visible to those individuals so they may note their behavioral status. FIGS. 3A through 3C disclose different hanger or mounting means which may be used with any of the present board embodiments. In FIG. 3A, a tab 42 may be extended rearwardly from the back 44 of a board 10c, by means of separating the tab 42 from the backing material 44 along the perforations 46. A hole 48 in the tab 42 may then be used to hang the board 10c as desired.

FIG. 3B discloses a double sided adhesive pad 50, having release sheets 52 and 54 disposed respectively over the two adhesive surfaces 56 and 58 thereof. A first release sheet, e.g., 52, is removed and the adhesive surface 56 applied to the back of the present board, with the opposite second release sheet 54 then being removed to adhere the board to the desired surface (wall, appliance, upper cabinet, etc.). A magnet 60 having an adhesive surface 62 is disclosed in FIG. 3C; the adhesive surface 62 is applied to the back of the present board in any of its embodiments, and the magnet 60 used to secure the board magnetically to a suitable surface (refrigerator exterior, etc.). Other attachment means may be used in lieu of those described above, as desired.

Other variations upon the above described behavior tracking board embodiments may be provided, if so desired. The general configuration and use of the present board, e.g., board 10 of FIG. 1, has been described in detail hereinabove. Preferably, behavior is monitored over a period of time such as a week or so. It has been found that longer periods tend to make the behavioral goals sought by the parent or guardian to appear practically unreachable to a small child having a relatively short attention span. On the other hand, a period less than several days would result in frequent awards for good behavior, which would lessen their value. Accordingly, a one week period has been found to be optimum. Nevertheless, it is desirable that some form of accrual of good behavior "points" be provided, to encourage the formation of good behavior habits over the long term.

The board 10 of FIG. 1 discloses such an accrual system, with a bonus area 64 being disposed between each row 12 and its corresponding identification area 20. Each bonus area 64 may have a provision for two or more separate bonus markers, e.g., markers 66 and 68, slidably retained in their respective slots 70 and 72 in the manner of the retention of the markers 26 within the slots 32, discussed above. These bonus markers 66 and 68 are preferably differently colored, or at least have some means of indicating their difference to an observer. For example, the first bonus marker 66 may be colored green, the second marker 68 gold, with other colors being used for further markers. The markers, e.g. markers 66 and 68, are used for special behavior or accomplishments, as described further below.

The present behavior tracking board 10, and its other embodiments, are used by assigning individuals or children to corresponding behavior status rows, as described above. Each child or individual will have his or her own behavior status row; no sharing of the rows is done. The name of the child or individual is noted in the appropriate identification area corresponding to that person's row. The time period over which the person's behavior is to be tracked and monitored by using the board, is explained to the persons involved. (The time period, e.g., one week, or the beginning and ending days and/or dates, may also be noted somewhere on the board, e.g., using a grease pencil or the like on a smooth vinyl plastic board surface, or using some other means of recording the duration of the behavioral tracking period.)

At the beginning of the time period selected, all markers 26 are moved to the extreme right end 16 of their respective rows 12, thus positioning them beneath the "bonus star" category or column 24a of the reward and punishment categories 24. (Alternatively, a medial position to the right edge of the "No Treat" column 24b may be used as an initial position. This is more suitable for older children, as it is more demanding due to its lack of tolerance for any significant amount of undesirable behavior.) As the time period progresses, the parent, guardian, or supervisor will observe the behavior of the persons listed on the board. Assuming their behavior is good, the marker 26 remains in the initial position, beneath the "bonus star" column 24a (or alternative medial position, as discussed above), as shown by marker 26 in the uppermost behavioral status row 12 of FIG. 1. However, if an individual exhibits less than satisfactory behavior (e.g., refusing to put away toys or clothing, refusing to assist with assigned household chores, fighting with siblings, refusing to share, etc.), then that person's marker 26 is moved one position to the left for each incidence of less than satisfactory behavior.

An example of such is shown by the marker 26 of the second row 12 from the top in FIG. 1, with that marker 26 having been moved seven spaces to the left of the initial "bonus star" column 24a so that it is positioned in the area beneath the "treat" category 2c. This child has forfeited at least a portion of his or her allowance for the period, but still may be eligible for a special treat (favorite fast food meal, small toy, etc.) at the end of the period, assuming few further transgressions occur. In the event that a person exhibits very poor behavior for the period, that person's marker 26 will be positioned closer to the leftmost end 18 of their row 12, as shown by the lowermost marker 26. This person has forfeited all rights to allowance and treats, and will receive some punishment.

In the event the person(s) is able to maintain a perfect behavioral record for the entire time period, then their marker 26 would remain in the position beneath the "bonus star" column or category 24a. When this occurs, that person is entitled to a bonus of some sort, which is indicated by moving the first bonus marker 66 from its leftmost position in the slot 70, one position to the right. Rather than providing a bonus (special treat of some sort) to the person at that time, however, it may be desirable to teach longer term planning by allowing such bonuses to build up. Hence, the present behavior tracking board provides a series of three positions to the right of the initial position for the first bonus marker 66, to allow such bonus privileges to be built up over three weeks (or other time period used).

The above described behavior tracking board 10 of FIG. 1 is well suited to a family having one or more small children, as it provides sufficient space for a few children and the reward and punishment categories are suited to provide the maximum positive reinforcement of good behavior habits in small children. (It should be noted that the categories have intentionally been generalized, rather than having specific rewards or punishments shown. It is understood that different families with different children, will find that different rewards and punishments are more effective in encouraging good behavior in their children.) However, the present behavior tracking board also lends itself to use in day care or schoolroom environments, by extending the size of the board to accommodate a greater number of children.

Figure 4:
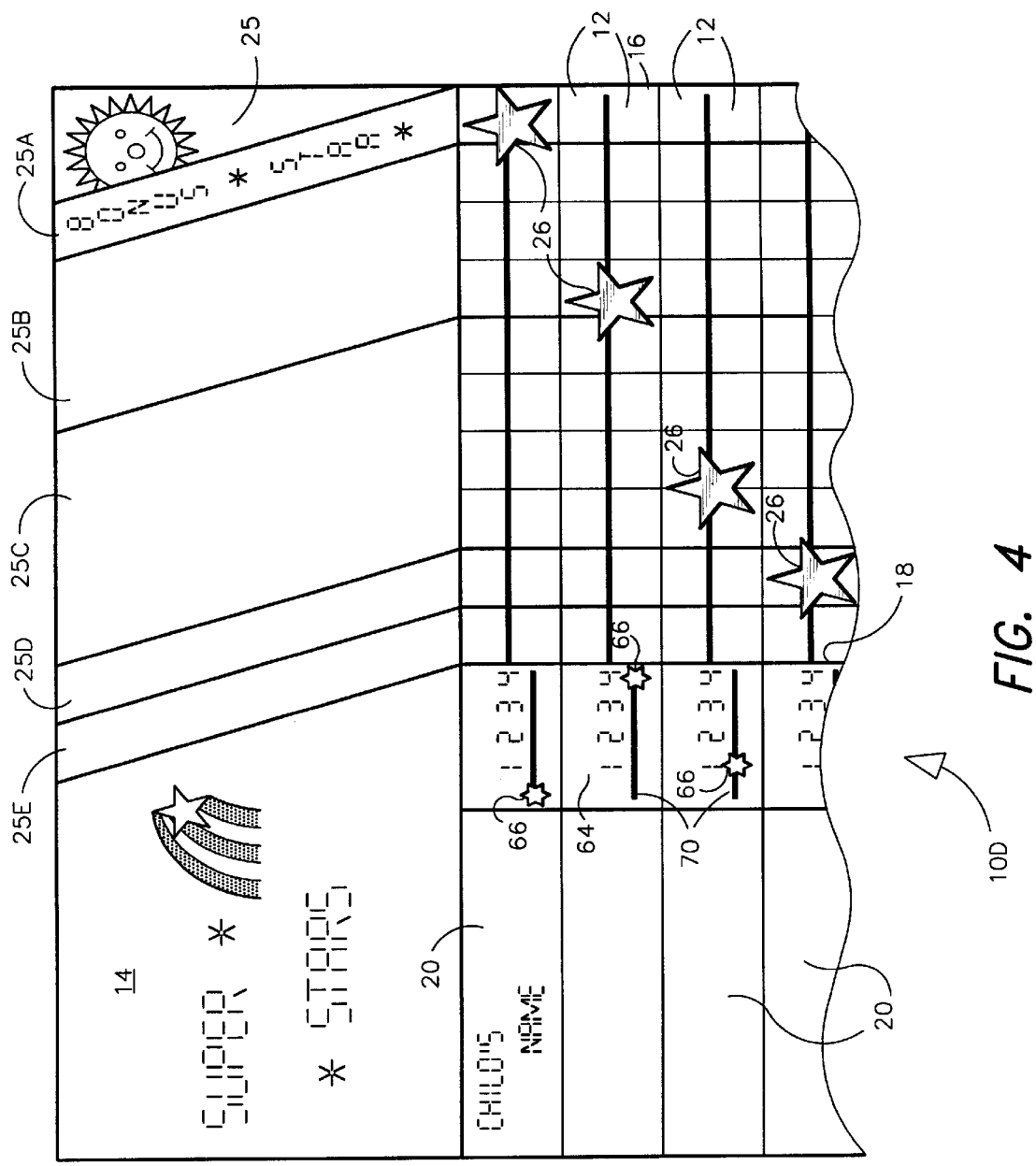
FIG. 4 is a partial plan view of an alternative embodiment of the board of FIG. 1, providing for the behavioral monitoring of additional individuals in a school or day care environment, or other large group.

FIG. 4 discloses such a day care or schoolroom type behavior tracking board, designated as board 10d. The board 10d will be seen to be similar to the board 10 of FIG. 1 described above, having a plurality of behavior status rows 12 extending from left to right across the surface 14 of the board 10a. Each of the rows 12 has a right end 16 and an opposite leftmost end 18, with an identification area 20 positioned to the left of each of the leftmost ends 18 of each of the rows 12. A plurality of behavior status positions 22 extend along each of the rows 12, with good behavior being to the right and poorer behavior being represented to the left.

A plurality of reward and punishment categories 25 extends above the rows 12, with a first or bonus category 25a being positioned to the extreme right, and a plurality of categories 25b through 25e extending to the left of the first category 25a in order of decreasing desirability.

It should be noted that the categories 25a through 25e of FIG. 4 number one less than the categories 24a through 24f of the board 10 of FIG. 1. This is due to the exclusion of a category for allowance, as such an allowance would not be provided customarily in a day care or school situation. Also, the number of categories may be customized as required to fit particular situations, and are intentionally left blank in FIG. 4. The categories 25a through 25e may comprise "Treat," "No Treat," "Stay After School," "Extra Work," etc., according to the specific situation and as desired by the teacher or caretaker for the group of children.

As in the case of the board 10 of FIG. 1, the board 10a of FIG. 4 also includes a behavior status marker 26 which is selectively movable along its respective row 12 to indicate behavioral status of the student or child assigned to that row 12. The marker 26 may use any suitable or practicable means of movable attachment to the board 10a, such as the slot 32 arrangement disclosed with the board 10 of FIG. 1. Bonus positions 64, with their respective markers 66 and slots 70, may also be provided. (Only a single bonus marker 66 is disclosed for each position 64 in FIG. 4, due to the day care or school environment anticipated for use of the board 10a. However, a second or additional markers may be added if so desired, as in the two markers 66 and 68 for each. bonus position 64 of the board 10 of FIG. 1.)

The board 10a of FIG. 4 is used in much the same manner as the board 10 of FIG. 1 discussed above, with the names of the children comprising the class or group being entered in separate identification areas 20 of the board 10a. The period of time over which behavior is to be tracked or monitored is determined, and preferably noted on the board 10a in some manner, as discussed above with the board 10 of FIG. 1. As in the case of the board 10, the children listed on the board 10a are each individually responsible for their own behavior, with exemplary behavior resulting in no movement of the marker 26 from its initial position beneath the bonus category 25a and poorer behavior resulting in movement of the marker 26 to the left, as explained above for the board 10 of FIG. 1.

Children who are able to maintain the position of their markers 26 at the extreme right end of their respective rows 12, are rewarded with movement of their respective bonus marker 66 one position to the right at the end of each period of good behavior. When a child has behaved sufficiently well to cause the bonus marker 66 to be moved completely to the right of their bonus area 64, that child is rewarded with some special, extraordinary treat or reward, e.g., free time, extra play time, or perhaps a party or a field trip. Other rewards may be provided, depending upon the nature of the children involved, the ability of the teacher or caretaker to organize or provide such rewards, etc.

Figure 5:
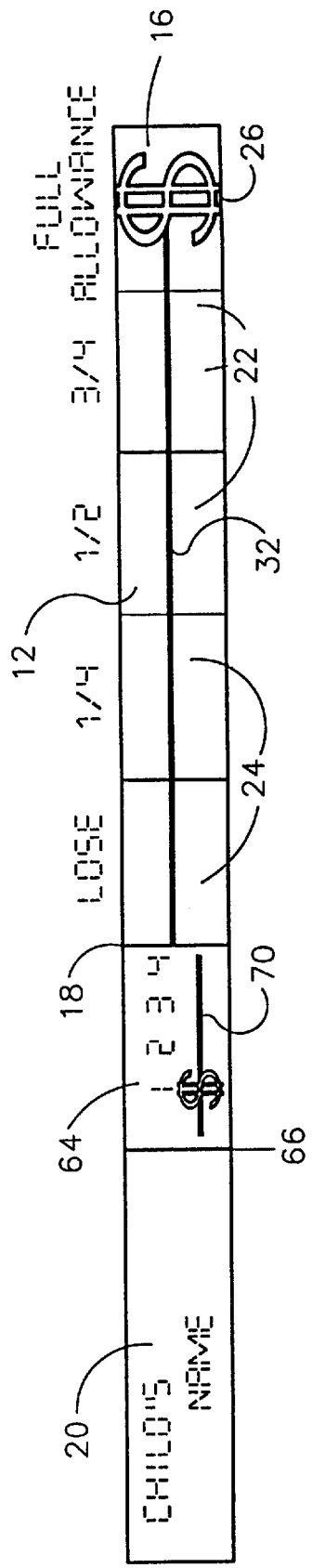
FIG. 5 is a plan view of another alternative embodiment of the present behavior tracking board, showing a configuration providing for the reduction or forfeiture of allowance for less than proper behavior.

FIG. 5 discloses a further alternative embodiment of the present behavior tracking board, designated as board 10e. With many persons, particularly those in their teens with a relatively large amount of freedom compared to younger children, a primary motivator is money. The board 10e of FIG. 5 recognizes this, and sets all of the behavioral status levels according to an allowance. With teens particularly, a monetary allowance reduction or loss is a major concern, and accordingly, other factors (treats or loss thereof, bonus positions for additional treats, etc.) are not provided. The board 10e comprises one or more behavior status rows 12 (only one is shown in FIG. 5, but additional rows may be added for additional individuals, as desired) having a rightmost end 16 and an opposite leftmost end 18, in the manner of the rows 12 of the boards 10a and 10d discussed above. An identification area 20 is positioned to the left of the left end 18 of the row 12.

The row 12 is divided into a plurality of behavior status positions 22, arranged from right to left along the row 12, and indicating progressively greater loss of allowance in accordance with progressively poorer behavior by the individual of that row 12. As an example, the rightmost position provides for full allowance, with the remaining four positions providing for a twenty five percent loss of allowance for each incident of less than desirable behavior. After four such incidents, all allowance is forfeited for the allowance period. (Other divisions may be used if desired, e.g., ten divisions resulting in a ten percent loss for each behavioral incident, etc.)

A marker 26 is movably installed on the board 10e, by means of a slot 32 as in other boards discussed above, or other means. The marker 26 may be of any configuration, but in keeping with the financial aspect of the board 10e, it is represented by a dollar sign. When behavioral transgressions occur (e.g., staying out too late, poor grades, disrespect, etc.), the marker 26 is moved progressively leftward to indicate the cut in allowance according to the transgression.

As in the case of other boards discussed further above, the board 10e also provides further reward for exemplary behavior, by means of a bonus area 64 disposed between the leftmost end 18 of the row 22 and the identification area 20. The bonus area 64 includes a movable bonus marker 66, which is selectively movable to one of a plurality of positions when exemplary behavior is maintained during the entire behavior monitoring period.

The board 10e is used in much the same manner as the boards 10 and 10d discussed hereinabove. The marker 26 is moved progressively leftward whenever a behavioral transgression occurs, resulting in some loss of allowance, depending upon the number of transgressions during the behavior monitoring period. If exemplary behavior is maintained for the entire period, the marker 26 is not moved, but the bonus marker 66 is moved to the right in its slot 70 by one position for each period of exemplary behavior. A financial reward of some sort (allowance increase, or perhaps a one time payment or valuable gift, etc.) is provided to the individual when his or her bonus marker 66 reaches the right end of its travel in the bonus area 64.

In summary, the above described behavior tracking board in its various embodiments provides a concrete, non-abstract means of monitoring the behavior of individuals, and enabling those individuals to remain constantly aware of their behavioral status and progress over a given period of time. It is well known in psychology that positive motivation, i.e., the provision of reward for desirable behavior, is a far more efficient motivational tool than is the provision of negative motivation, i.e., the threat of punishment for failing to attain certain standards. The present behavior tracking boards emphasize such positive motivation by providing rewards for good behavior, and bonuses for exemplary behavior over a prolonged period of time, and will serve as an excellent motivational tool for children of various ages and for groups in day care or school environments.

It is to be understood that the present invention is not limited to the sole embodiments described above, but encompasses any and all embodiments within the scope of the following claims.

I claim:

1. A behavior tracking board, comprising:

a planar surface including at least one generally horizontal behavior status row extending from left to right thereacross;

at least one identification area for placing the name of an assigned individual therein, disposed horizontally from said at least one row and corresponding thereto;

said at least one row further including a plurality of behavior status positions disposed therealong;

a plurality of reward and punishment categories extending generally vertically from said at least one row;

each of said categories being aligned with and corresponding to at least one of said behavior status positions of said at least one row;

a bonus area disposed between said at least one row and the corresponding said at least one identification area, with said bonus area including at least one bonus marker selectively slidably disposed therealong for selectively indicating a bonus for good behavior for the individual assigned to the corresponding said at least one row; and at least one selectively movable behavior status marker corresponding to said at least one row, for placing on a selected one of said behavior status positions of said at least one row beneath one of said reward and punishment categories for indicating the behavior status of the individual corresponding to said at least one row.

2. The behavior tracking board according to claim 1 wherein said plurality of reward and punishment categories are ordered from right to left in order of decreasingly good behavior.

3. The behavior tracking board according to claim 1 wherein said plurality of reward and punishment categories extend generally upwardly from said at least one row.

4. The behavior tracking board according to claim 1 wherein said at least one identification area is disposed leftward of the corresponding said at least one row.

5. The behavior tracking board according to claim 1 wherein said at least one behavior status marker is star shaped.

6. The behavior tracking board according to claim 1 wherein said at least one behavior status marker is star shaped.

7. The behavior tracking board according to claim 1 wherein said at least one behavior status row includes a slot formed medially therealong, with said slot having a wide undercut portion therebelow;

said at least one behavior status marker including a shank depending therefrom for guiding said marker within said slot; and said shank having a distal end with a retainer extending therefrom and across said undercut portion of said slot, for capturing said marker slidably along said slot.

8. The behavior tracking board according to claim 1 including hanger means for removably hanging said board from another object.

9. The behavior tracking board according to claim 8 wherein said planar surface includes a back, and said hanger means comprises at least one tab extendible from said back of said surface.

10. The behavior tracking board according to claim 8 wherein said surface includes a back, and said hanger means comprises an adhesive coating disposed upon said back of said surface.

11. A method of tracking the behavior of at least one individual, comprising the following steps:

(a) providing a behavior tracking board including at least one behavior status row extending from left to right across the board, a corresponding identification area disposed horizontally from the row, a plurality of behavior status positions along the row, a plurality of reward and punishment categories extending generally vertically from the row with the categories corresponding to the behavior status positions of the row, and at least one selectively movable behavior status marker corresponding to the row;

(b) assigning an individual to the corresponding at least one behavior status row, and recording the name of the individual in the identification area corresponding to the row;

(c) establishing a time period for tracking the behavior of the individual;

(d) selectively moving the behavior status marker along the row, according to the behavior of the individual;

(e) providing reward or punishment to the individual according to the final position of the behavior status marker at the end of the time period, relative to the reward and punishment categories;

(f) providing a bonus area having a plurality of bonus positions disposed between the at least one row and the corresponding identification area, and further providing a bonus marker selectively placeable at one of the positions of the bonus area;

(g) selectively and progressively moving the bonus marker along the bonus area to one of the positions, according to exemplary behavior of the corresponding individual during successive time periods; and (h) providing a reward to the individual according to the final position of the bonus marker at the end of the successive time periods.

12. The method of behavior tracking according to claim 11, including the step of ordering the plurality of reward and punishment categories from right to left in order of decreasingly good behavior.

13. The method of behavior tracking according to claim 11, including the step of positioning the plurality of reward and punishment categories generally upwardly from the at least one behavior status row.

14. The method of behavior tracking according to claim 11, including the step of positioning the corresponding identification area to the left of the at least one behavior status row.

15. The method of behavior tracking according to claim 11, including the step of providing hanger means for removably hanging the board from another object.

* * * * *